United States Patent [19]

Fewkes, Jr.

[11] Patent Number: 5,191,058
[45] Date of Patent: Mar. 2, 1993

[54] PREPARATION OF PEROXIDE TERMINATED POLYCARBONATE

[75] Inventor: Edward J. Fewkes, Jr., Galway, N.Y.

[73] Assignee: General Electric Company, Schenectady, N.Y.

[21] Appl. No.: 799,219

[22] Filed: Nov. 27, 1991

Related U.S. Application Data

[62] Division of Ser. No. 615,192, Nov. 19, 1990, abandoned, which is a division of Ser. No. 404,287, Sep. 7, 1989, abandoned.

[51] Int. Cl.$^5$ .............................................. C08G 64/20
[52] U.S. Cl. ..................................... 528/198; 528/196
[58] Field of Search ............................. 528/198, 196

[56] References Cited

U.S. PATENT DOCUMENTS 4,304,882 12/1981 D'Angelo et al. ................... 528/98

FOREIGN PATENT DOCUMENTS 59-27908 2/1984 Japan .

Primary Examiner—Harold D. Anderson
Attorney, Agent, or Firm—William H. Pittman

[57] ABSTRACT

Peroxy-terminated polycarbonates are prepared by the reaction of an aromatic dihydroxy compound, preferably a bisphenol, with phosgene in one or two steps, in the presence of a peroxy ester such as the mono-t-butyl perester of maleic acid. The peroxy-terminated polycarbonates may be employed to initiate vinyl polymerization of ethylenically unsaturated monomers or to react with polymers containing ethylenically unsaturated groups, to form copolymers which are useful as compatibilizers for blends of polycarbonates with said polymers.

7 Claims, No Drawings

PREPARATION OF PEROXIDE TERMINATED POLYCARBONATE

This application is a division of copending application Ser. No. 07/615,192, filed Nov. 19, 1990, which in turn is a division of Ser. No. 07/404,287, filed Sep. 7, 1989, both now abandoned.

This invention relates to the preparation of polycarbonates having functional end groups, suitable for the preparation of compatibilizing copolymers. More particularly, it relates to peroxide-terminated polycarbonates.

Polycarbonates, particularly aromatic polycarbonates, have long been recognized as a class of resins with valuable and advantageous properties. In recent years, the improvement of such properties of polycarbonates as ductility, solvent resistance and barrier properties has been of interest. One potential method of improving such properties in polycarbonates is by blending them with other polymers which have the desired properties. However, this is frequently difficult and the resulting blends may be deficient by reason of the incompatibility of polycarbonates with the other polymers in the blend.

It has also been recognized that polymer blends of this type can be compatibilized by the incorporation therein of a copolymer of the two polymers. The preparation of polycarbonate copolymers of this type requires the presence of a reactive functional group on the polycarbonate. Thus, for example, U.S. Pat. No. 4,732,934 describes the preparation of polycarbonate-polyamide copolymers from an anhydride-terminated polycarbonate, the latter in turn being prepared by the reaction of a compound such as trimellitic anhydride acid chloride with a hydroxy-terminated polycarbonate.

It will be apparent that the type of functionality required on a polycarbonate for reactions of this type is dependent in large part on the nature of the polymer with which copolymer formation is desired. In many instances, said polymer will be an addition polymer formed by a free radical reaction involving one or more ethylenically unsaturated monomers, illustrated by such commonly used and commercially important polymers as polystyrenes, aliphatic olefin polymers, polyvinyl halides, acrylic polymers and polymerized dienes. Provided the proper functionality is present on the polycarbonate, copolymer formation could then take place by initiation of the corresponding free radical polymerization reaction involving the unsaturated monomer(s) or by free radical-induced grafting through an olefinic bond present in the polymer.

Several varieties of functional polycarbonates capable of inducing free radical reactions are known in the art, but most of them require the presence of relatively exotic carbonate structural units. For example, Japanese Kokai 84/27908 describes the preparation of a copolyestercarbonate from bisphenol A and 5,5'-azobis(5-cyanovaleroyl chloride), a reagent which is not readily available at a reasonable price. Therefore, there is a continuing need for polycarbonates containing free radical reaction-inducing moieties which can be prepared by relatively simple means from inexpensive and readily available materials.

The present invention provides a method for preparing such polycarbonates. The products are peroxide-terminated polycarbonates which react readily with ethylenically unsaturated monomers and with polymers containing olefinic bonds, to produce copolymers capable of compatibilizing blends of the polycarbonate with the other polymer.

In one of its aspects, therefore, the present invention includes peroxide-terminated polycarbonates characterized by the presence of end groups having the formula

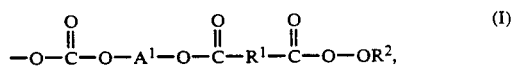

wherein $A^1$ is a divalent aliphatic, alicyclic or aromatic radical, $R^1$ is a divalent aliphatic or alicyclic radical and $R^2$ is a tertiary aliphatic or alicyclic radical.

Other than in their end group structure, the polycarbonates of the present invention are conventional. Thus, they may be considered as comprising structural units of the formula

wherein $A^1$ is as previously defined. Most often, $A^1$ is an aromatic radical, particularly a radical having the formula

wherein each of $A^2$ and $A^3$ is a monocyclic divalent aromatic radical and Y is a bridging radical in which one or two atoms separate $A^2$ from $A^3$. The free valence bonds in formula III are usually in the meta or para positions of $A^1$ and $A^2$ is relation to Y.

The $A^2$ and $A^3$ values may be unsubstituted phenylene or substituted derivatives thereof. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclo-hexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents may be present on the aliphatic, alicyclic and aromatic portions of the Y group.

Both homopolycarbonates and copolycarbonates may be employed, as well as copolyestercarbonates. Most preferably, they are bisphenol A homo- and copolycarbonates, in which, in at least a portion of the structural units, each of $A^2$ and $A^3$ is p-phenylene and Y is isopropylidene. The bisphenol A homopolycarbonates are often especially preferred by reason of their availability and excellent properties.

The end groups of the polycarbonates of this invention have formula I. In that formula, $R^1$ is a divalent aliphatic or alicyclic radical, ordinarily containing about 2–6 carbon atoms. It is usually aliphatic and contains about 2–4 carbon atoms. It may be saturated or may contain double or triple bonds, most often double bonds. Especially preferred are the —CH$_2$CH$_2$— and —CH=CH— radicals.

The R$^2$ value is a tertiary aliphatic or alicyclic radical, most often aliphatic and generally containing about 4-10 carbon atoms. The t-butyl radical is especially preferred by reason of its availability.

The peroxide-terminated polycarbonates of this invention may be prepared by the reaction of an organic dihydroxy compound, preferably a dihydroxyaromatic compound such as a bisphenol, with phosgene in the presence of a peroxy ester of the formula

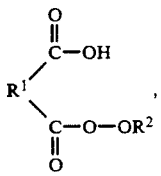

(IV)

wherein R$^1$ and R$^2$ are as previously defined, as a chain termination agent (hereinafter sometimes "chainstopper"). This method is another aspect of the invention. In most instances, the preferred compound of formula IV is the mono-t-butyl perester of maleic acid, since it is commercially available at relatively low cost.

Preparation of the peroxide-terminated polycarbonate is ordinarily most conveniently conducted under conventional interfacial conditions, employing as an organic solvent a substantially water-immiscible liquid such as methylene chloride. Said reaction occurs in an alkaline medium, in the presence of a tertiary amine such as triethylamine as catalyst. It may be conducted in one step, employing phosgene in combination with the dihydroxy compound and the peroxy ester. It is often preferred, however, to first prepare a bischloroformate oligomer composition by reaction of the bisphenol with phosgene under alkaline conditions, and subsequently to add the catalyst and convert said bischloroformate composition to a polycarbonate, as described, for example, in U.S. Pat. Nos. 4,737,573 and 4,743,676, the disclosures of which are incorporated by reference herein. Introduction of the chainstopper prior to conversion to the polycarbonate, as disclosed in the aforementioned U.S. Pat. No. 4,743,676, is often particularly preferred.

The proportion of chainstopper is selected so as to produce a polycarbonate of the desired molecular weight, and can be readily determined on that basis by routine experimentation. It is usually found that somewhat higher proportions of peroxy ester must be employed to produce a polycarbonate of a specific molecular weight than is the case with conventional chainstoppers such as phenols. Thus, about 1-10 and preferably about 2-8 mole percent of peroxy ester, based on bisphenol, is generally employed.

The preparation of the peroxide-terminated polycarbonates of this invention is illustrated by the following example.

EXAMPLE 1

A 500-ml. Morton flask fitted with a phosgene dip tube, an overhead stirrer, a Friedrich condenser, a 50-ml. pressure equalizing addition funnel and a pH probe was charged with 3.01 grams (56 mmol.) of bisphenol A, 60 ml. of water and 100 ml. of methylene chloride, and the pH thereof was adjusted to between 9 and 10 by the addition of 50% aqueous sodium hydroxide solution. Phosgene was added at the rate of 0.32 grams per minute, with stirring, as the pH was maintained at 9.5-10.0 by addition of sodium hydroxide solution as necessary. Phosgene addition was stopped after 20 minutes and the mixture was sparged with nitrogen and stirred for 5 minutes after nitrogen sparging ceased.

There was then added 0.75 gram (2.8 mmol.) of the mono-t-butyl perester of maleic acid, and stirring was continued for another 30 minutes. After the addition of 1 ml. of 0.56 M triethylamine solution in methylene chloride, phosgene addition at 0.32 gram per minute was resumed for 10 minutes, with maintenance of the pH in the range of 9.0-9.5. The mixture was again sparged with nitrogen for 5 minutes and was allowed to stand until a negative reading was obtained with phosgene detection paper. The organic layer was separated, washed three times with aqueous hydrochloric acid solution and once with deionized water (whereupon a negative chloride test was obtained with silver nitrate) and poured into acetone in a blender. The peroxide-terminated polycarbonate precipitated as a white powder and was removed by vacuum filtration and dried for 60 hours in a vacuum oven at 45° C. It was shown to have the desired molecular structure by proton nuclear magnetic resonance and Fourier transform infrared spectroscopy. Gel permeation chromatographic analysis showed the product to have a weight average molecular weight of 61,200 and a number average molecular weight of 30,000.

The peroxide-terminated polycarbonates of this invention undergo reaction with ethylenically unsaturated compounds, initiating free radical reaction thereof which is followed by coupling with the polycarbonate to yield copolycarbonates which are another aspect of the invention. The ethylenically unsaturated compounds which may be employed include polymerizable monomers such as ethylene, propylene, styrene, vinyl chloride, acrylic acid, acrylonitrile, ethyl acrylate, methyl methacrylate, maleic anhydride, butadiene and isoprene. They may be employed singly or in admixture. The preferred compounds for many purposes are styrene, maleic anhydride and acrylic monomers, especially acrylonitrile. Ethylenically unsaturated polymers, such as polybutadiene and styrene-butadiene copolymers, may also be employed.

The copolymer-forming reaction may be conducted in solution in a suitable solvent for the peroxide-terminated polycarbonate and the ethylenically unsaturated compound. Where appropriate, as when the ethylenically unsaturated compound is a polymer, it may also be conducted in the melt, typically in an extruder. The proportions of peroxide-terminated polycarbonate and ethylenically unsaturated compound are not critical but may be varied according to the properties of the desired product.

In most instances, preparation of copolycarbonates by reaction of the peroxide-terminated polycarbonate with at least one ethylenically unsaturated monomer will also result in some homopolymerization of said monomer(s). The presence of homopolymer is frequently not detrimental. However, said homopolymer may be removed if desired, typically by dissolution in a solvent therefor which does not dissolve the copolycarbonate.

The precise molecular structures of the copolycarbonates of this invention are not known with certainty. It is virtually certain that the peroxide-terminated polycarbonate generates an alkoxy free radical with the formation of a polymeric carboxy-terminated free radical; the latter may then decarboxylate to form an alkyl- or vinyl-terminated radical. In any event, the polymeric radical apparently initiates polymerization of the ethylenically unsaturated monomer, or reacts similarly with a polymer containing olefinic groups to form a graft copolymer.

The preparation of the copolycarbonates of this invention is illustrated by the following examples.

EXAMPLES 2-6

A solution of 5.08 grams of the product of Example 1 and 18 grams of one or more vinyl monomers in 50 ml. of m-dichlorobenzene was purged with nitrogen and heated in a nitrogen atmosphere to 100° C. for 10 minutes, to 150° C. for 1.5 hours and to 190° C. for 15 minutes. The solutions were cooled and poured into methanol in a blender, whereupon the copolycarbonates precipitated. They were removed by filtration, slurried three times in methanol and filtered, and dried overnight in a vacuum oven at 110° C.

Molecular weights were determined by gel permeation chromatography relative to polystyrene. In addition, proton nuclear magnetic resonance spectroscopic analysis was performed to confirm the molecular structures of the products, and Soxhlet extraction was performed to determine the proportion of vinyl homopolymer (unbound to polycarbonate) present. The results are given in the following table.

TABLE I

| Example | Monomer(s) | Extraction solvent | % recovered after extraction Example | % recovered after extraction Control | % vinyl homopolymer | Mw |
| --- | --- | --- | --- | --- | --- | --- |
| 2 | Styrene | Cyclohexane | 70 | 30 | 30 | 136,700 |
| 3 | Styrene (86%), maleic anhydride (14%) | Ethyl acetate | 58 | 20 | 40 | 131,000 |
| 4 | Methyl methacrylate | Acetone | 66 | 39 | 30 | 90,800 |
| 5 | Styrene (97%), divinylbenzene (3%) | | Product gelled | | | |
| 6 | Styrene (72%), acrylonitrile (28%) | Acetone | 68 | 31 | 30 | 144,000 |

EXAMPLE 6

A mixture of 300 grams of the product of Example 1 and 300 grams of a commercially available styrene-butadiene-styrene triblock copolymer was dry blended and extruded on a twin screw extruder at temperatures from 120° to 275° C., at a screw speed of 400 rpm. Soxhlet extraction of the extrudate with toluene showed that 38% by weight of the triblock copolymer was bound to polycarbonate.

The copolycarbonates of this invention are useful as compatibilizers for blends of homopolycarbonates with polymers of the vinyl monomers employed in copolycarbonate preparation, as well as chemically similar polymers (e.g., polyphenyene ethers which are miscible with polystyrenes in all proportions). Their effect is demonstrated under various circumstances by improved properties, including notched Izod impact strengths and tensile elongations, and improved blend morphologies as shown by inspection of the fracture surfaces of Izod test specimens.

For example, inspection of the fracture surface of a blend comprising 70% of a commercially available polycarbonate and 30% polystyrene showed the presence of a dispersed phase containing relatively large polystyrene particles, typically on the order of 2 microns. By contrast, a similar blend compatibilized by the presence of the copolymer of Example 2 in the amount of 25% by weight contained much smaller polystyrene particles, typically on the order of 0.25-0.5 micron.

Likewise, blends of equal weights of a commercially available polycarbonate and a commercially available poly(2,6-dimethyl-1,4-phenylene ether) were shown to have a dispersed polycarbonate phase with particles as large as 15-20 microns. Particle sizes of the same order of magnitude were observed in blends which additionally contained 5% by weight of polystyrene. By contrast, polyphenylene ether-polycarbonate blends containing 25% by weight of the copolymer of Example 2 contained much smaller particle sizes, typically on the order of 1-2 microns, in the dispersed phase.

Similar effects were observed in blends comprising bisphenol A polycarbonate and the triblock copolymer employed in Example 6. Much smaller particles in the discontinuous phase were observed when the copolymer of Example 6 was employed as a compatibilizer than when it was absent.

In addition, notched Izod impact strengths and tensile elongations were improved by the use of the copolymer of Example 6 as a compatibilizer. This is shown in Table II.

TABLE III

| Parts by weight Polycarbonate | Parts by weight Triblock | Parts by weight Copolycarbonate | Izod impact strength, joules/m. | Tensile elongation, % |
| --- | --- | --- | --- | --- |
| — | 50 | 50 | 192 | 103 |
| 50 | 50 | — | 48 | 17 |
| 60 | 20 | 20 | 150 | 104 |
| 80 | 20 | — | 11 | 6 |

What is claimed is:

1. A method for preparing a peroxide-terminated polycarbonate which comprises reacting an organic dihydroxy compound with phosgene in the presence of a peroxy ester of the formula

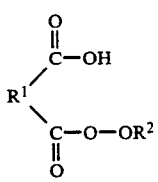

(IV)

as a chain termination agent, wherein $R^1$ is a divalent aliphatic or alicyclic radical and $R^2$ is a tertiary aliphatic or alicyclic radical.

2. A method according to claim 1 wherein the dihydroxy compound is a dihydroxyaromatic compound having the formula

HO-A²-Y-A³-OH, wherein each of A² and A³ is a monocyclic divalent aromatic radical and Y is a bridging radical in which one or two atoms separate A² from A³.

3. A method according to claim 2 wherein R¹ is

—CH$_2$CH$_2$— or —CH=CH—

4. A method according to claim 3 wherein R¹ is —CH=CH— and R² is t-butyl.

5. A method according to claim 4 wherein each of A² and A³ is p-phenylene and Y is isopropylidene.

6. A method according to claim 2 wherein the reacting is conducted in one step

7. A method according to claim 2 wherein the reacting is conducted in two steps, the first being the preparation of a bischloroformate oligomer composition and the second being the conversion of said bischloroformate oligomer composition to a polycarbonate.

* * * * *